(12) United States Patent
Gosamo et al.

(10) Patent No.: US 9,097,067 B2
(45) Date of Patent: Aug. 4, 2015

(54) ABRASIVE TIP FOR ABRASIVE TOOL AND METHOD FOR FORMING AND REPLACING THEREOF

(75) Inventors: Ignazio Gosamo, Leglise (BE); Sebastien Marcel Robert Douveneau, Angevillers (FR)

(73) Assignees: SAINT-GOBAIN ABRASIVES, INC., Worcester, MA (US); SAINT-GOBAIN ABRASIFS, Conflans-Saint Honorine (FR)

( * ) Notice: Subject to any disclaimer, the term of this patent is extended or adjusted under 35 U.S.C. 154(b) by 246 days.

(21) Appl. No.: 12/703,407

(22) Filed: Feb. 10, 2010

(65) Prior Publication Data
US 2010/0200304 A1 Aug. 12, 2010

Related U.S. Application Data

(60) Provisional application No. 61/151,971, filed on Feb. 12, 2009.

(51) Int. Cl.
| | |
|---|---|
| *E21B 10/02* | (2006.01) |
| *B23B 51/04* | (2006.01) |
| *B28D 1/04* | (2006.01) |

(52) U.S. Cl.
CPC ............ *E21B 10/02* (2013.01); *B23B 51/0466* (2013.01); *B28D 1/041* (2013.01); *B23B 2226/75* (2013.01); *B23B 2240/08* (2013.01); *Y10T 29/49734* (2015.01)

(58) Field of Classification Search
USPC ................... 175/403, 405.1; 408/204; 125/20
See application file for complete search history.

(56) References Cited

U.S. PATENT DOCUMENTS

| | | | |
|---|---|---|---|
| 1,676,887 A * | 7/1928 | Chamberlin | 175/403 |
| 1,949,513 A | 3/1934 | Greenwood | |
| 1,954,330 A | 4/1934 | Schurr | |
| 3,088,251 A | 5/1963 | Davis | |
| 3,590,535 A | 7/1971 | Benson et al. | |
| 3,594,141 A | 7/1971 | Houston et al. | |
| 3,613,472 A | 10/1971 | Held | |

(Continued)

FOREIGN PATENT DOCUMENTS

| | | |
|---|---|---|
| CN | 87208852 U | 12/1987 |
| CN | 1040535 A | 3/1990 |

(Continued)

OTHER PUBLICATIONS

PCT Application No. PCT/US2010/023807, Filed Feb. 11, 2010, "Notification of Transmittal of the International Search Report and The Written Opinion of the International Searching Authority, or the Declaration", dated Sep. 30, 2010, 9 pages.

(Continued)

*Primary Examiner* — David Andrews
(74) *Attorney, Agent, or Firm* — Abel Law Group, LLP; Joseph P. Sullivan

(57) ABSTRACT

A device for securing a plurality of abrasive segments to an abrasive tool is provided. The abrasive tool includes a rotatable body with an outer diameter and an inner diameter. The device includes a carrier element that includes a first portion that accommodates the plurality of abrasive segments and a second portion opposite from the first portion that attaches to the rotatable body. The second portion includes a shoulder extending therefrom that facilitates centering with the rotatable body.

14 Claims, 5 Drawing Sheets

(56) References Cited

U.S. PATENT DOCUMENTS

| | | | |
|---|---|---|---|
| 3,777,443 A | 12/1973 | Shaw | |
| 3,850,590 A | 11/1974 | Chalkley et al. | |
| 3,955,324 A | 5/1976 | Lindstrom | |
| 4,155,721 A | 5/1979 | Fletcher | |
| 4,208,154 A | 6/1980 | Gundy | |
| 4,224,380 A | 9/1980 | Bovenkerk et al. | |
| 4,397,555 A | 8/1983 | Malcolm et al. | |
| 4,453,484 A | 6/1984 | Englund | |
| 4,689,919 A | 9/1987 | Kawakita et al. | |
| 4,925,457 A | 5/1990 | deKok et al. | |
| 4,931,363 A | 6/1990 | Slutz et al. | |
| 4,977,710 A | 12/1990 | Une | |
| 5,049,165 A | 9/1991 | Tselesin | |
| 5,074,080 A | 12/1991 | Erhardt et al. | |
| 5,082,070 A * | 1/1992 | Obermeier et al. | 175/403 |
| 5,092,910 A | 3/1992 | deKok et al. | |
| 5,127,197 A | 7/1992 | Brukvoort et al. | |
| 5,127,923 A | 7/1992 | Bunting et al. | |
| 5,190,568 A | 3/1993 | Tselesin | |
| D342,270 S * | 12/1993 | Kwang | D15/139 |
| 5,380,390 A | 1/1995 | Tselesin | |
| 5,385,591 A | 1/1995 | Ramanath et al. | |
| 5,505,750 A | 4/1996 | Andrews | |
| 5,507,686 A | 4/1996 | Wolters | |
| 5,518,443 A | 5/1996 | Fisher | |
| 5,718,736 A | 2/1998 | Onishi et al. | |
| 5,791,330 A | 8/1998 | Tselesin | |
| 5,817,204 A | 10/1998 | Tselesin | |
| 5,865,571 A | 2/1999 | Tankala et al. | |
| 5,868,125 A | 2/1999 | Maoujoud | |
| 5,906,245 A | 5/1999 | Tibbitts et al. | |
| 5,932,508 A | 8/1999 | Armstrong et al. | |
| 5,980,678 A | 11/1999 | Tselesin | |
| 6,024,635 A | 2/2000 | Cruickshank et al. | |
| 6,033,295 A | 3/2000 | Fisher et al. | |
| 6,039,641 A | 3/2000 | Sung | |
| 6,192,875 B1 | 2/2001 | Koroku et al. | |
| 6,193,770 B1 | 2/2001 | Sung | |
| 6,273,082 B1 | 8/2001 | Tselesin | |
| 6,286,498 B1 | 9/2001 | Sung | |
| D458,948 S | 6/2002 | Chianese et al. | |
| D459,375 S | 6/2002 | Chianese et al. | |
| D459,376 S | 6/2002 | Chianese et al. | |
| D459,740 S | 7/2002 | Chianese et al. | |
| 6,453,899 B1 | 9/2002 | Tselesin | |
| 6,458,471 B2 | 10/2002 | Lovato et al. | |
| 6,482,244 B2 | 11/2002 | Tselesin | |
| 6,485,533 B1 | 11/2002 | Ishizaki et al. | |
| 6,752,709 B1 | 6/2004 | Skibo et al. | |
| 6,755,729 B2 | 6/2004 | Ramanath et al. | |
| 6,817,936 B1 | 11/2004 | Skeem et al. | |
| 6,827,072 B2 | 12/2004 | Schwammle | |
| 6,872,133 B2 | 3/2005 | Lee et al. | |
| 6,878,051 B2 | 4/2005 | Brach | |
| 6,935,940 B2 | 8/2005 | Skeem et al. | |
| 7,210,474 B2 | 5/2007 | Gaida et al. | |
| 7,444,914 B2 | 11/2008 | Brach | |
| 7,879,129 B2 | 2/2011 | Kosters et al. | |
| 7,946,907 B2 | 5/2011 | Heyen | |
| 8,591,295 B2 | 11/2013 | Gosamo et al. | |
| 2001/0023558 A1 | 9/2001 | Tselesin | |
| 2001/0025457 A1 | 10/2001 | Tselesin | |
| 2002/0129807 A1 | 9/2002 | Cervantes | |
| 2003/0213483 A1 | 11/2003 | Sakarcan | |
| 2003/0232586 A1 | 12/2003 | Ramanath et al. | |
| 2005/0235978 A1 | 10/2005 | Kim et al. | |
| 2005/0279533 A1 | 12/2005 | Corica | |
| 2006/0160476 A1 | 7/2006 | Bright et al. | |
| 2006/0185492 A1 | 8/2006 | Chianese | |
| 2007/0099548 A1 | 5/2007 | Kumar et al. | |
| 2008/0076338 A1 | 3/2008 | Andrews et al. | |
| 2008/0153402 A1 | 6/2008 | Arcona et al. | |
| 2009/0199692 A1 | 8/2009 | Heyen | |
| 2009/0199693 A1 | 8/2009 | Heyen | |
| 2010/0035530 A1 | 2/2010 | Gosamo et al. | |
| 2010/0200304 A1 | 8/2010 | Gosamo et al. | |
| 2010/0248600 A1 | 9/2010 | Chianese et al. | |
| 2010/0279138 A1 | 11/2010 | Zheng | |
| 2011/0023911 A1 | 2/2011 | Lenkeit et al. | |

FOREIGN PATENT DOCUMENTS

| | | | |
|---|---|---|---|
| CN | 1239451 A | | 12/1999 |
| CN | 201295881 Y | | 8/2009 |
| DE | 19650718 A1 | | 6/1998 |
| EP | 0917939 A1 | | 5/1999 |
| EP | 0925378 B1 | | 4/2002 |
| EP | 0871562 B1 | | 1/2003 |
| EP | 2075092 A2 | | 7/2009 |
| GB | 822058 A | | 10/1959 |
| GB | 2086822 | | 5/1982 |
| GB | 2086823 | | 5/1982 |
| GB | 2086824 | | 5/1982 |
| JP | 51121880 A | * | 10/1976 |
| JP | S60178568 U | | 11/1985 |
| JP | 62-68764 U | | 4/1987 |
| JP | 01-246077 | | 10/1989 |
| JP | H02160475 A | | 6/1990 |
| JP | H3-60981 U | | 3/1991 |
| JP | 8066869 A | | 3/1996 |
| JP | H08323631 A | | 12/1996 |
| JP | 3034101 U | | 2/1997 |
| JP | H11-915 | | 1/1999 |
| JP | 2000061932 A | | 2/2000 |
| JP | 2001038718 A | | 2/2001 |
| JP | 2001527469 A | | 12/2001 |
| JP | 2002028856 A | | 1/2002 |
| JP | 2002079469 A | | 3/2002 |
| JP | 2002-530212 | | 9/2002 |
| JP | 2003011113 A | | 1/2003 |
| JP | 2003011115 A | | 1/2003 |
| JP | 3092359 U | | 3/2003 |
| JP | 2003103410 A | | 4/2003 |
| JP | 2004-524170 | | 8/2004 |
| JP | 2007-90565 | | 4/2007 |
| JP | 2007136817 A | | 6/2007 |
| JP | 2007517675 A | | 7/2007 |
| JP | 2007216306 A | | 8/2007 |
| JP | 2009078055 A | | 4/2009 |
| JP | 2011-530417 | | 12/2011 |
| KR | 10-0263787 B1 | | 5/2000 |
| SU | 410955 | | 1/1974 |
| SU | 799956 | | 1/1981 |
| SU | 844258 A1 | | 7/1981 |
| SU | 1175724 | | 8/1985 |
| WO | 9810110 A1 | | 3/1998 |
| WO | 9824593 A1 | | 6/1998 |
| WO | 9857771 A1 | | 12/1998 |
| WO | 00/30808 | | 6/2000 |
| WO | 02/45907 | | 6/2002 |
| WO | 2006031044 A1 | | 3/2006 |
| WO | 2010/016959 | | 2/2010 |
| WO | 2010097223 A1 | | 9/2010 |
| WO | 2010/118440 | | 10/2010 |
| WO | 2011/029106 | | 3/2011 |

OTHER PUBLICATIONS

Hilti, "A breakthrough in speed", Hilti DD-B Series Core Bits, 2001, Hilti Corporation, http://www.hilti.com, 7 pages.

Norton, "Silencio" Clipper, 2009, pp. 26-27.

Norton, "Silencio" Clipper, 2010, pp. 28-29.

Norton, Saint-Gobain, "Silencio" Clipper, 2011, pp. 28-29.

Norton, Saint-Gobain, "Silencio" Clipper, 2012, pp. 24-25.

Norton, Saint-Gobain Abrasives, "Technical and Sales Argumentation" 2008, 12 pages.

Norton, Saint-Gobain Abrasives S.A., "Silencio" EN13236, 2011, 2 pages.

Norton, Saint-Gobain Abrasives, "Silencio—Product Sheer", 2009, 1 page.

International Search Report for PCT/US2010/041858 dated Aug. 17, 2011, 12 pgs.

(56) References Cited

OTHER PUBLICATIONS

U.S. Appl. No. 13/180,991, filed Jul. 12, 2011, Inventors: Ignazio Gosamo et al.
International Search Report for PCT/US2010/023807 dated Sep. 30, 2010, 7 pgs.
International Search Report for PCT/US2009/043356 dated Apr. 12, 2010, 8 pgs.
International Search Report for PCT/US2010/062633 dated Sep. 27, 2011, 6 pgs.
U.S. Appl. No. 12/983,075, filed Dec. 31, 2010, Inventors: Marc Linh Hoang et al.
U.S. Appl. No. 12/463,228, filed May 8, 2009, Inventors: Ignazio Gosamo et al.
Office Action dated Oct. 8, 2012 from Russian Application No. 2011137203, 3 pages.
Office Action dated Dec. 18, 2012 from Japanese Patent Application No. 2011-522075, 4 pages.
Beijing 152 Factory, A new method of making diamond abrasive tools, Aug. 29, 1974, Non-metallic minerals, pp. 62-64, vol. 4.
Shi Xingkuan, et al., The Function of Wheel Infiltrant and Its Suitable Selection, Tool Engineering, Sep. 22, 1995, pp. 23-26, vol. 29, Issue 9.

* cited by examiner

ABRASIVE TIP FOR ABRASIVE TOOL AND METHOD FOR FORMING AND REPLACING THEREOF

CROSS REFERENCE TO RELATED APPLICATIONS

This application claims the benefit of U.S. Provisional Application Ser. No. 61/151,971 filed on Feb. 12, 2009 and entitled "ABRASIVE TIP FOR ABRASIVE TOOL AND METHOD FOR FORMING AND REPLACING THEREOF", which is incorporated by reference herein in its entirety.

BACKGROUND

The present invention relates generally to abrasive tools used for drilling, cutting and grinding concrete, natural stone and other hard materials. More specifically, the present invention relates to a device that secures a plurality of abrasive segments to an abrasive tool and method for forming the device as well as replacing when worn.

A core bit is one type of abrasive tool that uses abrasive segments containing diamond to drill holes in concrete. A typical diamond core bit that can be used to drill holes in a concrete structure (e.g., a wall, floor, ceiling, column, bridge deck, etc.,) is produced by attaching individual diamond containing segments to the front face of a steel tube. The diamond core bit cuts a hole by using an electrical or hydraulic motor to spin the core bit around its axial axis, while at the same time being pushed forward either manually or by an automatic feeding mechanism to provide penetration. The drilling may be preferably done with coolant (e.g., water) but dry drilling may also be applied. In this manner of operation, an outside wall of a cylindrical opening is generated, while at the same time an inner core element is generated that detaches from the concrete structure once the diamond core bit has fully penetrated through the structure.

Eventually, the diamond segments become worn and have to be replaced. Replacing the diamond segments on a core bit is known as re-tipping the core bit. A typical re-tipping operation of a core bit will depend on how the diamond segments are secured to the front face of the steel tube. For example, the diamond segments may be brazed, laser welded or direct sintered to the front face of the steel tube. For the case of braze fitted diamond segments, a core bit user may de-braze the residues of the worn diamond segments from the face of the steel tube and braze fit new diamond segments to the same tube face. The steel tube with new diamond segments attached thereto may typically be shortened by a few millimeters as a result of this re-tipping operation. Shortening will only take place generally if the tube is cut up right behind the diamond segments in order to avoid the debrazing and this is typically only done in a repair shop. However, if the re-tipping operation is to be done directly on a construction site, then normally the only option is the debrazing and subsequent braze fitting of new segments. Overall, the re-tipping operation allows reduction in the costs associated with the core bit, which at the end reduces the cost of drilling holes in concrete and similar structures.

SUMMARY

In one embodiment, there is a device for securing a plurality of abrasive segments to an abrasive tool having a rotatable body with an outer diameter and an inner diameter. In this embodiment, the device comprises a carrier element having a first portion that accommodates the plurality of abrasive segments and a second portion opposite from the first portion that attaches to the rotatable body. The second portion comprises a shoulder extending therefrom that facilitates centering with the rotatable body.

In a second embodiment, there is a core bit tip that comprises a plurality of abrasive segments and a carrier element that accommodates the plurality of abrasive segments. The carrier element has a first portion configured to receive the plurality of abrasive segments and a second portion opposite from the first portion that attaches to one end of a core bit tubular body having an inner diameter and an outer diameter. The second portion has a shoulder extending therefrom that facilitates the centering of the carrier element with respect to the inner diameter and an outer diameter of the core bit tubular body.

In a third embodiment, there is a core bit that comprises a core bit tip comprising a ring-shaped carrier element having a first portion with a plurality of abrasive segments secured thereto and a second portion comprising a shoulder extending therefrom. The core bit further comprises a core bit tubular body having an inner diameter and an outer diameter that accommodates the core bit tip at one end thereof. The shoulder facilitates centering of the core bit tip with respect to the inner diameter and an outer diameter of the core bit tubular body.

In a fourth embodiment, there is a method of forming a core bit tip. In this embodiment, the method comprises: providing a carrier element having first portion and a second portion opposite from the first portion, the second portion having a shoulder extending therefrom that facilitates centering of the carrier element with respect to an inner diameter and an outer diameter of a core bit tubular body; and attaching a plurality of diamond segments to the first portion.

In a fifth embodiment, there is a method of forming a core bit. In this embodiment, the method comprises: providing a core bit tip comprising a ring-shaped carrier element having a first portion with a plurality of abrasive segments secured thereto and a second portion opposite from the first portion comprising a shoulder extending therefrom; providing a core bit tubular body having an inner diameter and an outer diameter that accommodates the core bit tip at one end thereof; centering the shoulder of the second portion of the core bit tip with respect to the inner diameter and outer diameter of the core bit tubular body; and attaching the core bit tip to the core bit tubular body following the centering of the shoulder of the second portion of the core bit tip with respect to the inner diameter and outer diameter of the core bit tubular body.

In a sixth embodiment, there is a method of re-tipping a core bit. In this embodiment, the method comprises: removing a worn core bit tip from a core bit tubular body having an inner diameter and an outer diameter that accommodates the core bit tip at one end thereof; providing an unworn core bit tip comprising a ring-shaped carrier element having a first portion with a plurality of abrasive segments secured thereto and a second portion opposite from the first portion comprising a shoulder extending therefrom; centering the shoulder of the second portion of the unworn core bit tip with respect to the inner diameter and outer diameter of the core bit tubular body; and attaching the unworn core bit tip to the core bit tubular body following the centering of the shoulder of the second portion of the core bit tip with respect to the inner diameter and outer diameter of the core bit tubular body.

DETAILED DESCRIPTION OF THE EMBODIMENTS

Figure 1:
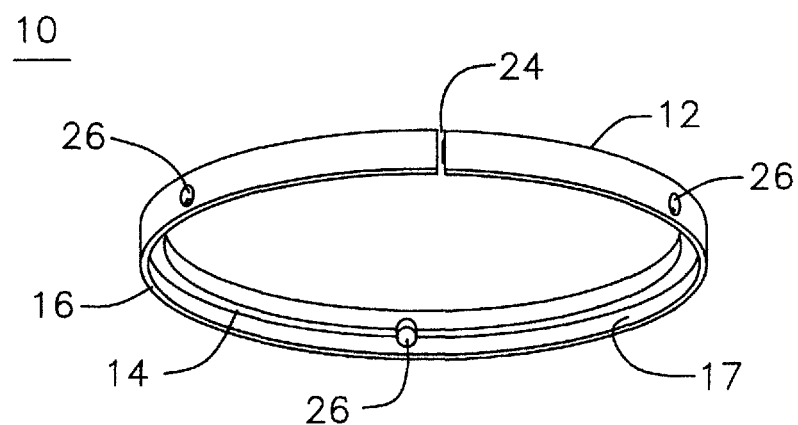
FIG. 1 is a perspective view of a carrier element used in a core bit tip according to one embodiment.
Figure 2:
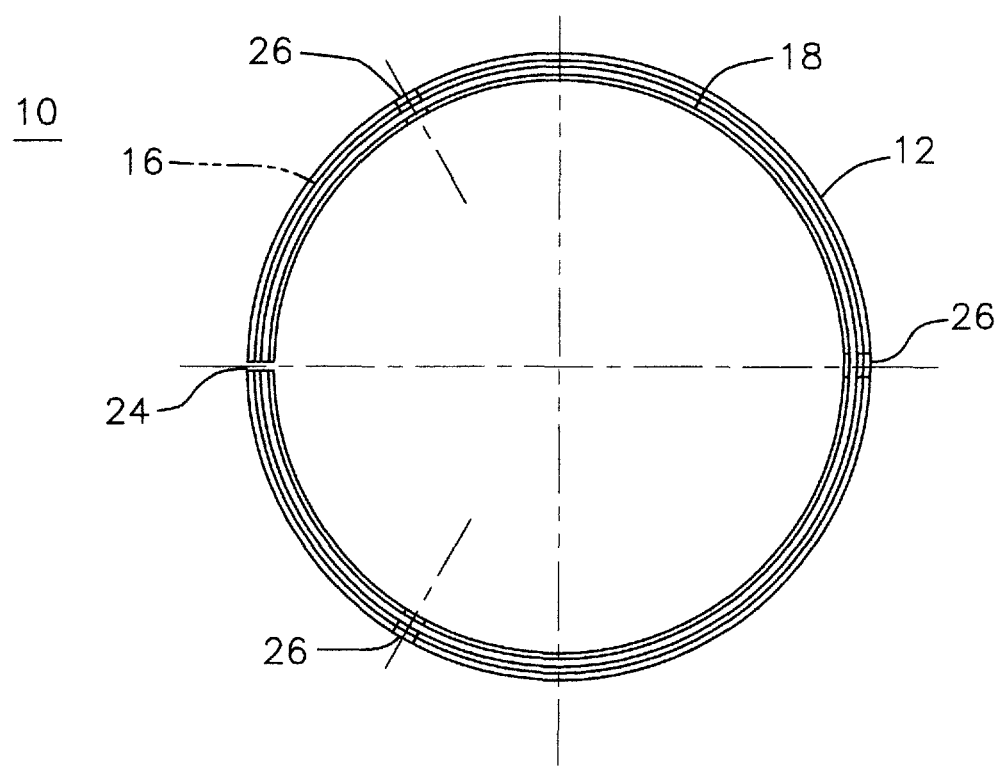
FIG. 2 is top view of the carrier element shown in FIG. 1 according to one embodiment.

Referring to the drawings, FIGS. 1-2 illustrate a carrier element 10 used as part of a tip for an abrasive tool according to one embodiment. In one embodiment, carrier element 10 may be used as part of a core bit tip for use with a core bit in a drilling tool. As shown in FIGS. 1-2, carrier element 10 is a ring-shaped carrier that can be a solid metal disk, a ring, a ring section, or a plate. Although carrier element 10 is illustrated as being ring-shaped, those skilled in the art will recognize that the carrier can have a variety of shapes and that the principles of the present invention are not limited to any particular shaped carrier. Carrier element 10 can include heat treatable steel alloys, such as 30CrNiMo8, 25CrMo4, 75Cr1, C60, or simple construction steel like St 60. Carrier element 10 as described herein can have a tensile strength of at least about 600 N/mm². Carrier element 10 can be formed to its final geometry and dimensions by a variety of metallurgical techniques known in the art.

As shown in FIGS. 1-2, carrier element 10 has a first portion 12 that accommodates the plurality of abrasive segments (not illustrated in these figures) and a second portion 14 opposite from first portion 12 that attaches to a rotatable body (e.g., a core bit tubular body) having an outer diameter and an inner diameter (not illustrated in these figures). Second portion 14 comprises a shoulder 16 that extends therefrom at an outer edge 17 of second portion 14. Shoulder 16 facilitates the centering of carrier element 10 with the rotatable body. As is known in the art, a shoulder is generally an area adjacent to or along the edge of a higher, more prominent part. In this embodiment, shoulder 16 assures centering of carrier element 10 on the outer diameter of the rotatable body. This permits a face of second portion 14 that is substantially perpendicular to shoulder 16 to rest at one end of the rotatable body on a front face that is between the outer diameter and inner diameter and shoulder 16 to rest on the outer diameter of the rotatable body. These features are described below and illustrated in FIG. 11. With the face of second portion 14 resting on this front face of the rotatable body and shoulder 16 resting on the outer diameter of the rotatable body at this same end thereof, carrier element 10 can then be solidly attached to the rotatable body in various well-known processes which are described below.

Figure 3:
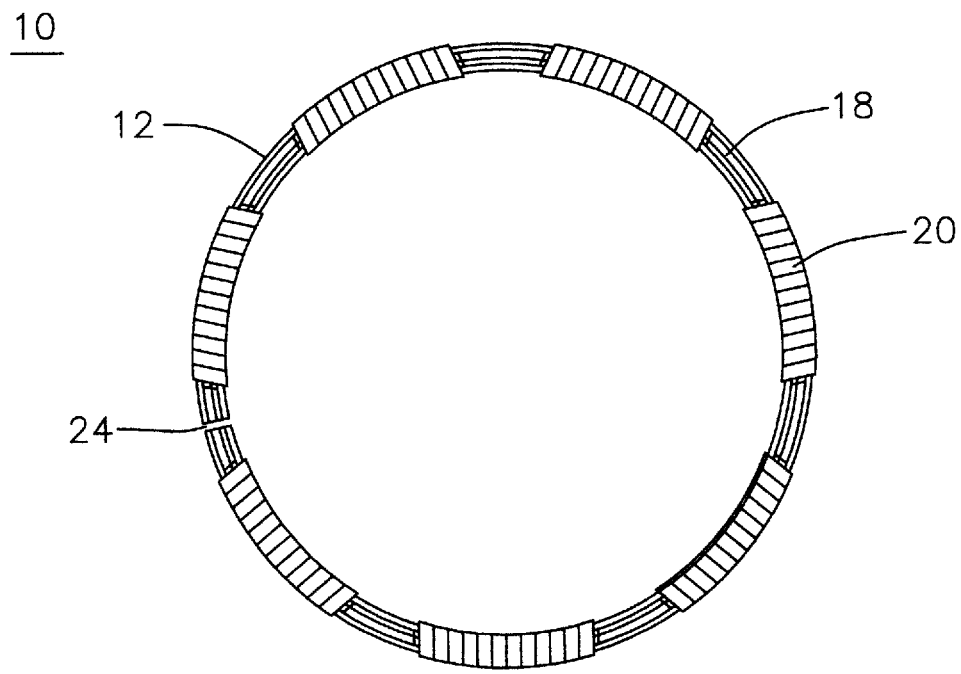
FIG. 3 is top view of the carrier element shown in FIG. 2 with abrasive segments secured thereto according to one embodiment.
Figure 4:
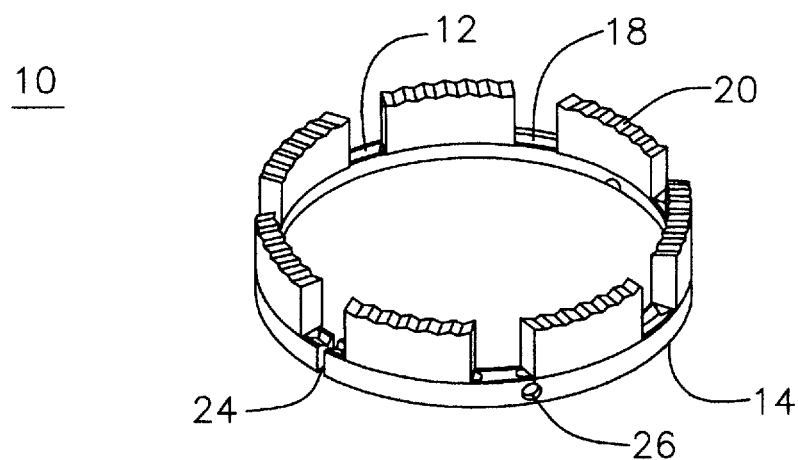
FIG. 4 is a perspective view of the carrier element and abrasive segments shown in FIG. 3 according to one embodiment.

In one embodiment, as shown in FIGS. 2-4, first portion 12 of carrier element 10 comprises a groove 18 formed therein that accommodates a plurality of abrasive segments 20 (see FIGS. 3 and 4). Although groove 18 is shown in FIGS. 2-4 as having a V-shape, those skilled in the art will recognize that other shaped grooves (e.g., U-shaped) can be formed utilizing well-known metallurgical techniques and that embodiments of the present invention are not limited to any particular shape. Generally, whatever shaped groove is used, it is desirable that a bottom portion of abrasive segments 20 have the same profile in order to mate to groove 18.

Figure 5:
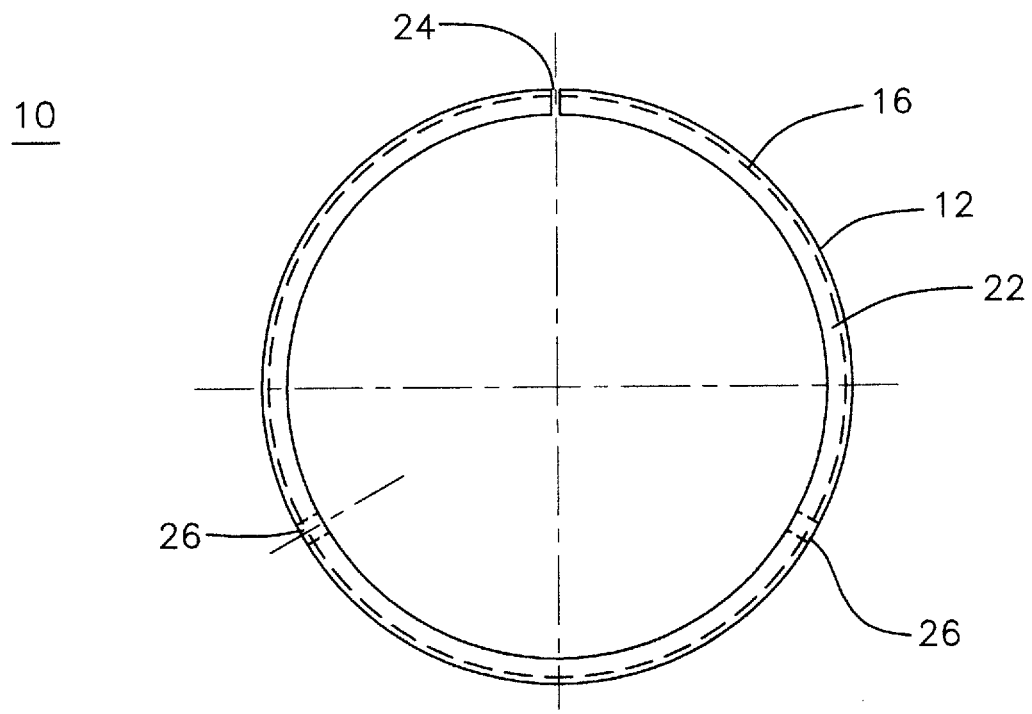
FIG. 5 is top view of the carrier element shown in FIG. 1 according to a second embodiment.
Figure 6:
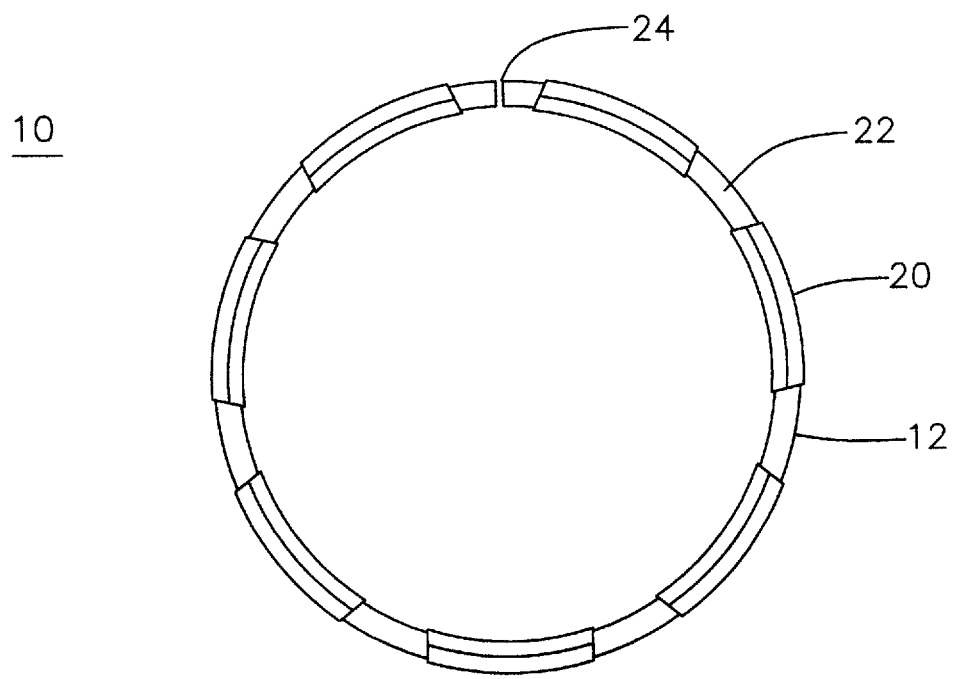
FIG. 6 is top view of the carrier element shown in FIG. 5 with abrasive segments secured thereto according to one embodiment.
Figure 7:
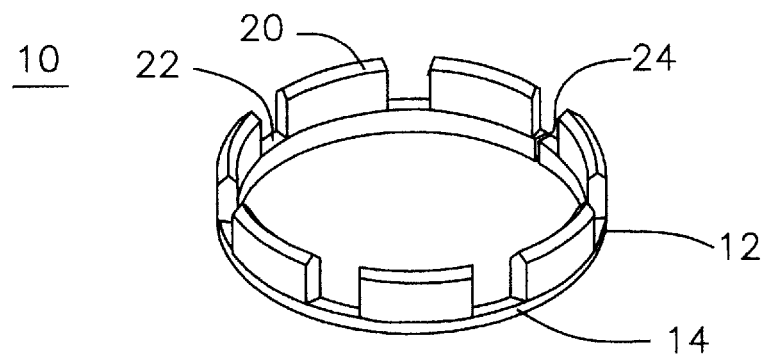
FIG. 7 is a perspective view of the carrier element and abrasive segments shown in FIG. 6 according to one embodiment.

In another embodiment, as shown in FIGS. 5-7, first portion 12 of carrier element 10 comprises a flat face 22 that accommodates abrasive segments 20 (see FIGS. 3 and 4). In this embodiment, the bottom portion of abrasive segments 20 will have the same profile to mate with flat face 22.

Another feature of carrier element 10 that is shown in FIGS. 1-7, is a slot 24 that extends through first portion 12 and second portion 14 including shoulder 16. Slot 24 allows carrier element 10 to fit easily on a range of rotatable bodies that may have varying outer diameters.

Another element of carrier element 10 that is shown in FIGS. 1-2 and 4-5 is a number of holes 26 located across the profile of carrier element 10. Holes 26 are located across the profile of carrier element 10 in a radial direction in order to ease the penetration by capillary action of silver solder into the interface between carrier element 10 and the rotatable body for embodiments where the two are brazed together with silver solder. The holes will permit the brazing process to provide a very strong bonding between carrier element 10 and the rotatable body. In a preferred embodiment, carrier element 10 will have three holes 26 located across its profile, however, those skilled in the art will recognize that one or more holes 26 may be used.

Figure 8:
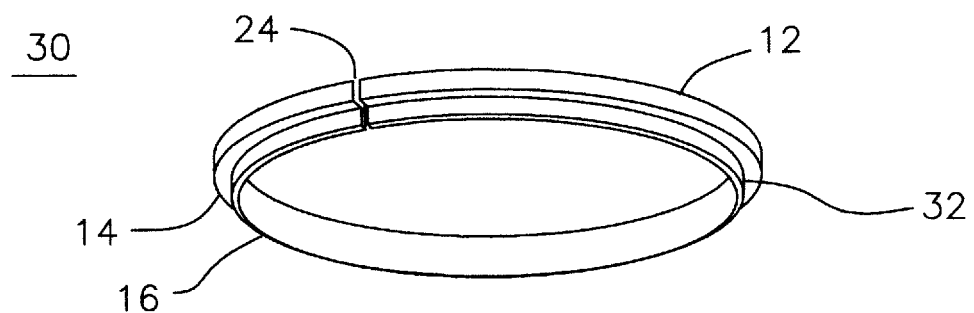
FIG. 8 is a perspective view of a carrier element used in a core bit tip according to a second embodiment.
Figure 9:
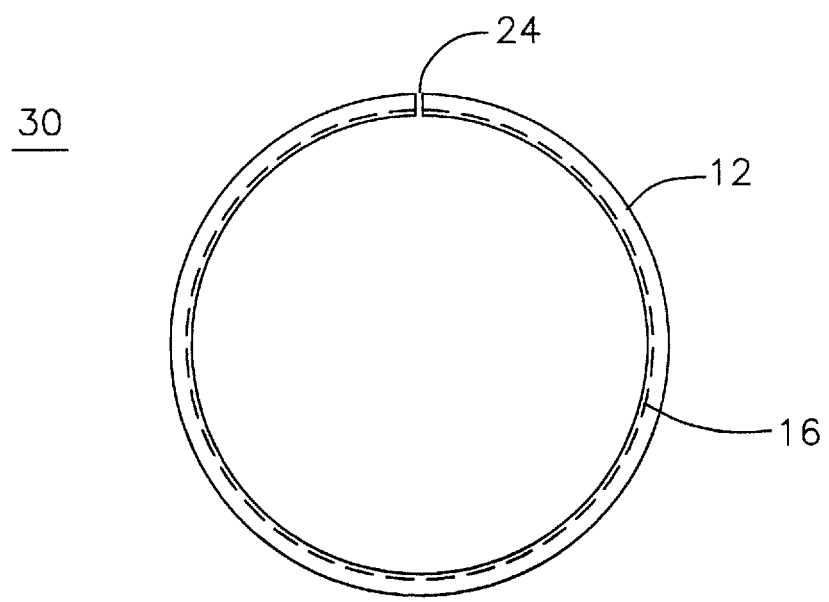
FIG. 9 is top view of the carrier element shown in FIG. 8 according to one embodiment.

FIGS. 8-9 illustrate a second embodiment of a carrier element. In this embodiment, carrier element 30 is similar to carrier element 10, however, the location of shoulder 16 with respect to second portion 14 is different. In particular, shoulder 16 in the embodiment shown in FIGS. 8-9 is located about an inner edge 32 of second portion 14, while shoulder 16 in the embodiment of FIGS. 1-7 is located about its outer edge. In this embodiment, shoulder 16 assures centering of carrier element 30 on the inner diameter of the rotatable body. This permits the face of second portion 14 that is substantially perpendicular to shoulder 16 to rest on the front face between the outer diameter and inner diameter of the rotatable body and shoulder 16 to rest on the inner diameter of the rotatable body. These features are described below and illustrated in FIG. 13. With the face of second portion 14 resting on this front face of the rotatable body and shoulder 16 resting on the inner diameter of the rotatable body at this same end thereof, carrier element 30 can then be solidly attached to the rotatable body in various well-known processes which are described below.

Although not illustrated in FIGS. 8-9, carrier element 30 may have similar features to the ones shown in FIGS. 1-7 for carrier element 10. In particular, first portion 12 of carrier element 30 can have groove 18 formed therein that accommodates abrasive segments 20. As mentioned above, groove 18 can be V-shaped, U-shaped, etc., to accommodate similarly shaped bottom portions of abrasive segments 20. Alternatively, first portion 12 of carrier element 30 can comprise flat face 22 to accommodate bottom portions of abrasive segments 20 having the same profile. Another feature that carrier element 30 may include, is slot 24 extending through first portion 12 and second portion 14 including shoulder 16. Carrier element 30 may also have a number of holes 26 located across its profile in a radial direction. As mentioned above, three holes is the preferred number, however, those skilled in the art will recognize that one or more holes 26 may be used.

Figure 10:
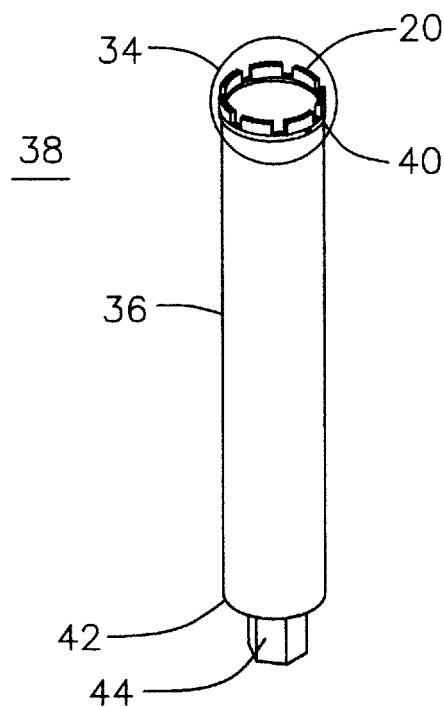
FIG. 10 shows a core bit with a core bit tip accommodated by a core bit tubular body according to one embodiment.

FIG. 10 shows carrier element 10 used in a core bit as part of a core bit tip 34 accommodated by a core bit tubular body 36 according to one embodiment. Core bit tip 34 and core bit tubular body 36 collectively form a core bit 38. Core bit tubular body which may be a steel tube receives core bit tip 34 at a front end 40 and at a back end 42 opposite thereof there is a fastening element 44 such as for example a nut with a threaded opening for detachably securing to a drilling tool. Those skilled in the art will recognize that fastening element 44 may include other well known elements besides a threaded nut and embodiments of the present invention are not limited to any particular one.

Figure 11:
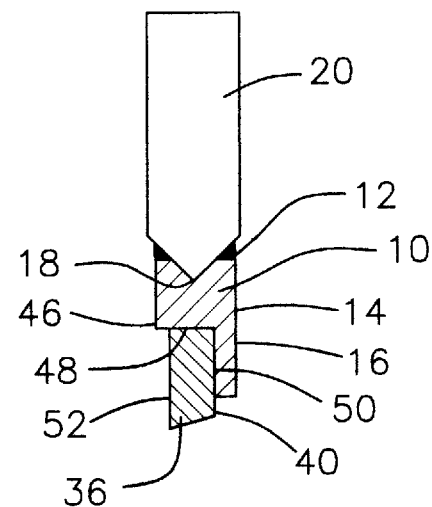
FIG. 11 shows a cross-sectional view of a core bit tip with a carrier element depicted in FIG. 1 that is accommodated by the core bit tubular body depicted in FIG. 10 according to one embodiment.

FIG. 11 shows a cross-sectional view of the coupling of core bit tip 34 with carrier element 10 depicted in FIGS. 1-7 to core bit tubular body 36 according to one embodiment. In particular, FIG. 11 shows a face 46 of second portion 14 that is substantially perpendicular to shoulder 16 resting on a front face 48 formed between the outer diameter 50 and inner diameter 52 at front end 40 of core bit tubular body 36 and shoulder 16 resting on outer diameter 50 of core bit tubular body 36. With face 46 of second portion 14 resting on front face 48 of core bit tubular body 36 and shoulder 16 resting on outer diameter 50 of core bit tubular body 36, core tip 34 can then be solidly attached to core bit tubular body 36 in various well-known processes which are described below.

Figure 12:
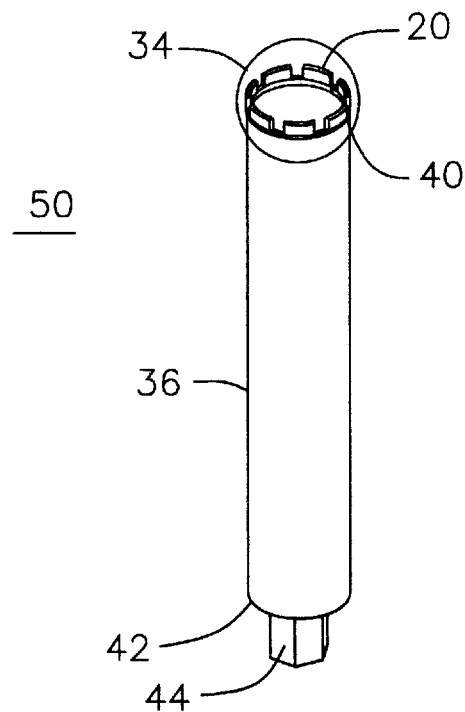
FIG. 12 shows a core bit with a core bit tip accommodated by a core bit tubular body according to a second embodiment.
Figure 13:
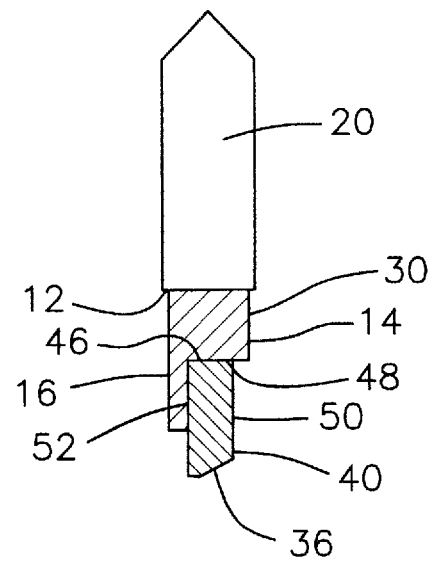
FIG. 13 shows a cross-sectional view of a core bit tip with a carrier element depicted in FIG. 8 that is accommodated by the core bit tubular body depicted in FIG. 12 according to one embodiment.

FIG. 12 shows a core bit 50 in which carrier element 30 is used as the part of core bit tip 34 that couples to core bit tubular body 36 according to one embodiment. Core bit 50 is similar to core bit 38 shown in FIG. 10, except that carrier element 30 is used and the shape of abrasive segments 20 are different. The difference in the shape of abrasive segment 20 is illustrated in FIG. 13. In particular, abrasive segment 20 in FIG. 13 has a flat-shaped bottom and pointed top section, whereas abrasive segment 20 in FIG. 11 has a V-shaped bottom portion and flat-shaped top section.

FIG. 13 also shows a cross-sectional view of the coupling of core bit tip 34 with carrier element 30 depicted in FIGS. 8-9 to core bit tubular body 36 according to another embodiment. In particular, FIG. 13 shows face 46 of second portion 14 that is substantially perpendicular to shoulder 16 resting on front face 48 formed between outer diameter 50 and inner diameter 52 at front end 40 of core bit tubular body 36 and shoulder 16 resting on inner diameter 52 of core bit tubular body 36. With face 46 of second portion 14 resting on front face 48 of core bit tubular body 36 and shoulder 16 resting on inner diameter 52 of core bit tubular body 36, then core tip 34 can be solidly attached to core bit tubular body 36.

It can be appreciated that carrier elements 10 and 30 enable quick and easy attachment of core bit tip 34 to core bit tubular body 36. In particular, using either the outside or inside portion of shoulder 16 to rest on the inner diameter 52 or outer diameter 50 of core bit tubular body 36 assures concentric and solid attaching of core bit tip 34 to core bit tubular body 36.

Once the core tip 34 has been secured to the core bit tubular body 36 in one of the aforementioned embodiments, then core tip 34 and core bit tubular body 36 may be attached to each other using one of the following methodologies. In one embodiment, a brazing process may be used to attach core tip 34 to core bit tubular body 36. In this embodiment, the brazing process may use an induction or torch brazing principle to attach core tip 34 to core bit tubular body 36. In this embodiment, low temperature silver brazing alloys such as BrazeTec 4900 or the like can be used. As mentioned above, holes 26 in carrier elements 10 or 30 allow for easy flow of the braze alloy by capillary action into the interface during the brazing process to provide a very strong bond between core tip 34 to core bit tubular body 36. In another embodiment, core tip 34 can be attached to core bit tubular body 36 by using an adhesive such as a high strength glue that has a relatively high level of temperature resistance. Illustrative but not limiting examples of a high strength glue may include cyanoacrylate adhesives. In another embodiment, core tip 34 can be attached to core bit tubular body 36 by fastening the two together using a mechanical locking device. Illustrative but not limiting examples of a mechanical locking device may include a bayonet lock, rivets or clips.

Abrasive segments 20 that may be used with carrier elements 10 or 30 may include an abrasive component that includes abrasive particles embedded in a metal matrix having a network of interconnected pores that are partially or substantially fully filled with an infiltrant. The abrasive particles can be a superabrasive such as diamond or cubic boron nitride. The abrasive particles can have a particle size of not less than about 400 US mesh, such as not less than about 100 US mesh, such as between about 25 and 80 US mesh. Depending on the application, the size can be between about 30 and 60 US mesh. The abrasive particles can be present in an amount between about 2 vol % to about 50 vol %. Additionally, the amount of abrasive particles may depend on the application. For example, an abrasive component for a grinding or polishing tool can include between about 3.75 and about 50 vol % abrasive particles. Alternatively, an abrasive component for a cutting-off tool can include between about 2 vol % and 6.25 vol % abrasive particles. Further, an abrasive component for core drilling can include between about 6.25 vol % and 20 vol % abrasive particles.

The metal matrix can include iron, iron alloy, tungsten, cobalt, nickel, chromium, titanium, silver, and any combination thereof. In an example, the metal matrix can include a rare earth element such as cerium, lanthanum, and neodymium. In another example, the metal matrix can include a wear resistant component such as tungsten carbide. The metal matrix can include particles of individual components or pre-alloyed particles. The particles can be between about 1.0 microns and about 250 microns.

There may be a bonding region between abrasive segments 20 and top portion 12 of carrier elements 10 and 30 that can contain a bonding metal. The bonding metal in the bonding region can be continuous with the infiltrant filling the network of interconnected pores. In an exemplary embodiment, the bonding metal composition can include copper, a copper-tin bronze, a copper-tin-zinc alloy, or any combination thereof. The copper-tin bronze may include a tin content not greater than about 20 wt %, such as not greater than about 15 wt %. Similarly, the copper-tin-zinc alloy may include a tin content not greater than about 20 wt %, such as not greater than about 15 wt %, and a zinc content not greater than about 10 wt %.

According to embodiments herein, the bonding region can form an identifiable interfacial layer that has a distinct phase from both the underlying carrier and the abrasive component.

The bonding metal composition is related to the infiltrant composition in having a certain degree of commonality of elemental species. Quantitatively, an elemental weight percent difference between the bonding metal composition and the infiltrant composition does not exceed 20 weight percent. Elemental weight percent difference is defined as the absolute value of the difference in weight content of each element contained in the bonding metal composition relative to the infiltrant composition.

By way of example only, in an embodiment having a (i) bonding metal composition containing 85 weight percent Cu, 10 weight percent Sn and 5 weight percent Zn, and (ii) an infiltrant composition containing 82 weight percent Cu, 17 weight percent Sn, and 1 weight percent Zn, the elemental weight percent difference between the bonding metal composition and the infiltrant composition for Cu is 5 weight percent, for Sn is 7 weight percent and for Zn is 4 weight percent. The maximum elemental weight percent difference between the bonding metal composition and the infiltrant composition is, accordingly, 7 weight percent.

Other embodiments have closer compositional relationships between the bonding metal composition and the composition of the infiltrant. The elemental weight percent difference between the bonding metal composition and the infiltrant composition may, for example, not exceed 15 weight percent, 10 weight percent, 5 weight percent, or may not exceed 2 weight percent. An elemental weight percent difference of about zero represents the same composition making up the bonding region and the infiltrant. The foregoing elemental values may be measured by any suitable analytical means, including microprobe elemental analysis, and ignores alloying that might take place along areas in which the infiltrant contacts the metal matrix.

Abrasive segments 20 are preferably attached to top portion 12 of carrier elements 10 and 30 via the "infiltration attachment" of the segments with the interconnected pores through the bonding region between the segments and the top portion of the carrier elements. Those skilled in the art will recognize that other alternative methodologies may be used. In one embodiment, a brazing process may be used to attach abrasive segments to carrier elements 10 and 30. In this embodiment, the brazing process may use a preferably higher temperature braze alloy such as BrazeTec 2500 or the like to avoid segment detaching when the entire carrier element is attached to core bit tubular body 36 in a brazing process using a lower temperature braze alloy. In another embodiment, abrasive segments 20 can be attached to carrier elements 10 or 30 by using laser welding. In still another embodiment, abrasive segments 20 can be attached to carrier elements 10 or 30 by using direct sintering. With these alternative methodologies, it is likely that abrasive segments 20 may have a different structure than the "infiltrated segments". For example, it is likely that abrasive segments 20 that are attached to carrier elements 10 and 30 are produced by "hot pressing" or "free sintering" principles will have bond structures that are greater than 96% dense and have bond compositions such as pure cobalt or cobalt bronze. The diamond content on the other end may be identical to those described above for the "infiltrated segments".

Not only do carrier elements 10 and 30 facilitate easy and quick attachment of core bit tip 34 to core bit tubular body 36 at the factory level in which core bits are manufactured, it is readily apparent that the configurations of carrier elements 10 and 30 make it well suited for easy and quick re-tipping of the core bits at a job site or craftsman workshop once the abrasive segments 20 on the core tip 34 become worn and needs replacement thereof. In accordance with one embodiment of the present invention, once it is determined that the abrasive segments 20 on core tip 34 are worn or need replacement, an operator of core bit 38 or 50 removes the worn core bit tip 34 from core bit tubular body 36. The operator then takes an unworn core bit tip that can comprise carrier element 10 or 30 and centers shoulder 16 of second portion 14 of core bit tip 34 with respect to either inner diameter 52 or outer diameter 50 of core bit tubular body 36 depending on which carrier element 10 or 30 is used. The unworn core bit tip is attached to core bit tubular body 36 following the centering of shoulder 16 of second portion 14 of core bit tip 34 with respect to either inner diameter 52 or outer diameter 50 of core bit tubular body 36. Then the unworn core bit tip is secured to the core bit tubular body 36 using well-known processes that may include brazing, adhering with an adhesive material, or fastening the unworn core bit tip to the core bit tubular body with a mechanical locking device.

Although a preferred embodiment for carrier elements 10 and 30 is as a core bit tip for use in a core bit with a drilling tool, the carrier elements are suitable for use with other abrasive tools. For example, the principles of carrier elements 10 and 30F can be applied to cup wheels, face grinding wheels or saw blades.

While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

What is claimed is:

1. A device for securing a plurality of abrasive segments to an abrasive tool having a rotatable body with an outer diameter and an inner diameter, the device comprising:
   a carrier element having a first portion on which each of the abrasive segments of the plurality of abrasive segments is affixed and a second portion opposite from the first portion that attaches to the rotatable body, the second portion comprising a shoulder extending therefrom that facilitates centering with the rotatable body, and
   a bonding region between each abrasive segment of the plurality of abrasive segments and the first portion of the carrier element, the bonding region comprising a bonding metal continuous with an infiltrant filling a network of interconnected pores within each abrasive segment of the plurality of abrasive segments;
   wherein the carrier element defines a split ring having a uniform cross-sectional dimension extending throughout an entire circumference of the split ring and a single slot extending completely through the first portion of the carrier element and the second portion of the carrier element between adjacent abrasive segments;
   wherein the first portion comprises a groove configured to accommodate an abrasive segment of the plurality of abrasive segments;
   wherein the bonding metal includes a bonding metal composition containing at least one metal element, and the infiltrant includes an infiltrant composition containing at least one metal element;
   wherein the bonding metal composition and the infiltrant composition are compositionally similar to each other; and
   wherein an elemental weight percent difference between the bonding metal composition and the infiltrant composition does not exceed 20 weight percent, wherein the elemental weight percent difference is the absolute value of the difference in weight content of each element contained in the bonding metal composition relative to the infiltrant composition.

2. The device according to claim 1, wherein the shoulder centers on the outer diameter of the rotatable body, wherein a face of the second portion rests on a front face at one end of the rotatable body that is between the outer diameter and inner diameter thereof.

3. The device according to claim 2, comprising one or more holes located across a profile of the carrier element.

4. The device according to claim 3, wherein the one or more holes are located across the profile in a radial direction.

5. The device according to claim 3, comprising three holes located across the profile of the carrier.

6. The device according to claim 1, wherein the groove is V-shaped.

7. The device according to claim 1, wherein the bonding region comprises an interfacial layer comprising a distinct phase from the underlying carrier element and each of the abrasive segments of the plurality of segments.

8. The device according to claim 1, wherein the elemental weight percent difference between the bonding metal composition and the infiltrant composition does not exceed 15 weight percent.

9. The device according to claim 8, wherein the elemental weight percent difference between the bonding metal composition and the infiltrant composition does not exceed 10 weight percent.

10. The device according to claim 1, wherein the bonding metal composition includes copper (Cu), and wherein the infiltrant composition includes copper (Cu).

11. The device according to claim 1, wherein the bonding metal composition includes tin (Sn), and the infiltrant composition includes tin (Sn).

12. The device according to claim 1, wherein the bonding metal composition includes zinc (Zn), and the infiltrant composition includes zinc (Zn).

13. The device according to claim 1, wherein the bonding metal composition includes copper (Cu), tin (Sn), and zinc (Zn).

14. The device according to claim 1, wherein the infiltrant composition includes copper (Cu), tin (Sn), and zinc (Zn).

* * * * *